United States Patent [19]
Gardner

[11] Patent Number: 5,768,453
[45] Date of Patent: *Jun. 16, 1998

[54] METHOD AND APPARATUS FOR CONCENTRATING AND COMBINING THE ENERGY OF ASYMMETRIC DIODE LASER BEAMS

[75] Inventor: Leland V. Gardner, Buellton, Calif.

[73] Assignee: Raytheon Company, Los Angeles, Calif.

[*] Notice: The term of this patent shall not extend beyond the expiration date of Pat. No. 5,568,577.

[21] Appl. No.: 355,144

[22] Filed: Dec. 13, 1994

[51] Int. Cl.⁶ .................................. G02B 6/32
[52] U.S. Cl. .................. 385/33; 385/31; 385/14.7; 359/730
[58] Field of Search .................. 385/31, 33–35, 385/133, 146, 147; 359/710, 730

[56] References Cited

U.S. PATENT DOCUMENTS

| | | | |
|---|---|---|---|
| 4,325,633 | 4/1982 | Gardner | 356/141 |
| 5,011,253 | 4/1991 | Olsen | 385/33 |
| 5,044,717 | 9/1991 | Levatter | 385/33 |
| 5,080,706 | 1/1992 | Snyder et al. | 65/102 |
| 5,127,068 | 6/1992 | Baer et al. | 385/34 |
| 5,155,354 | 10/1992 | Hardy, Jr. et al. | 250/216 |
| 5,467,335 | 11/1995 | Braat | 359/710 X |
| 5,568,318 | 10/1996 | Leger et al. | 385/33 |
| 5,568,577 | 10/1996 | Hardy, Jr. et al. | 385/33 |

*Primary Examiner*—Phan T. H. Palmer
*Attorney, Agent, or Firm*—David W. Collins; Leonard A. Alkov; Glenn H. Lenzen, Jr.

[57] ABSTRACT

Methods and apparatus are disclosed for concentrating the energy of a laser diode beam by imaging a first numerical aperture of the beam in one beam plane to a reduced numerical aperture at a focal plane, and by guiding the beam between reflective boundaries to maintain the value of a lesser second numerical aperture in another beam plane at the focal plane. The reduced numerical aperture in the first plane optimally matches the second numerical aperture in the second plane so that the energy can be received into the entrance end of an optical fiber whose numerical aperture also matches the second numerical aperture. The area of this fiber preferably matches that of the image at the focal plane. A coupler that guides the beam to its focal plane preferably utilizes an imaging element, e.g., a cylindrical lens or a cylindrical elliptical mirror, and a pair of spaced reflective walls. The exit ends of a plurality of fibers that are illuminated by respective beams can be closely packed into any desired pattern which can be fractionally magnified by a relay lens into a very concentrated energy pattern. If desired, this final image may be fed into a single optical fiber for passage through remote or convoluted optical paths.

34 Claims, 5 Drawing Sheets

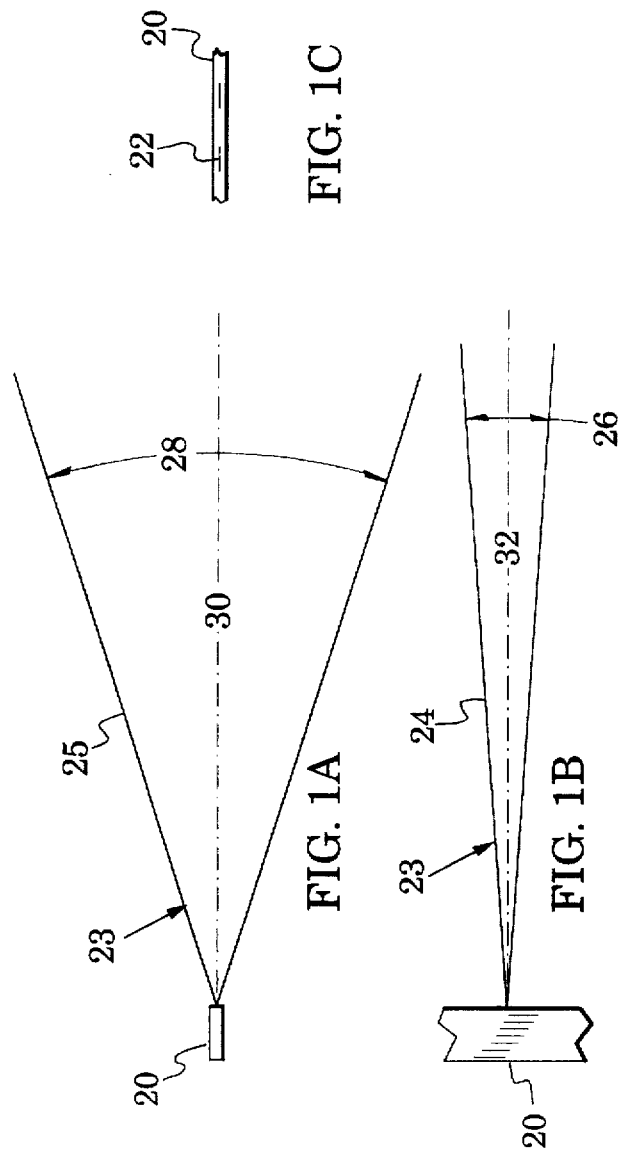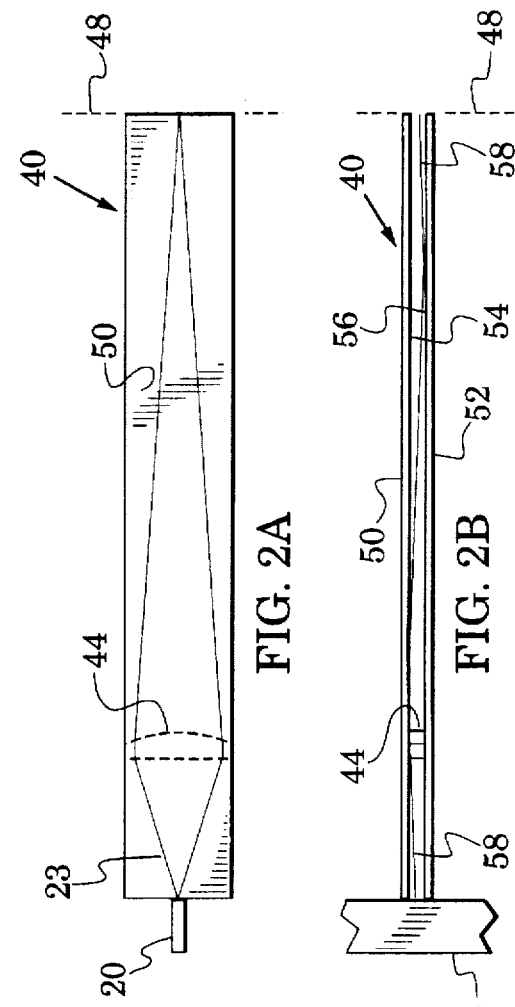

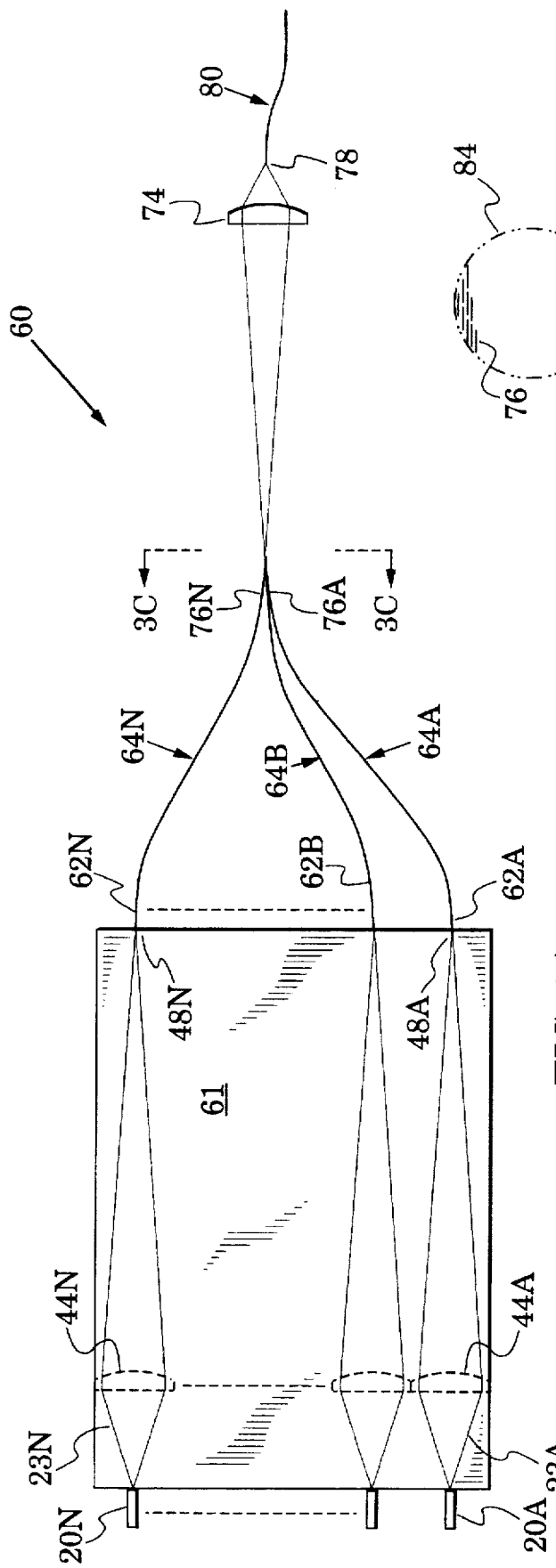
FIG. 3A
FIG. 3C
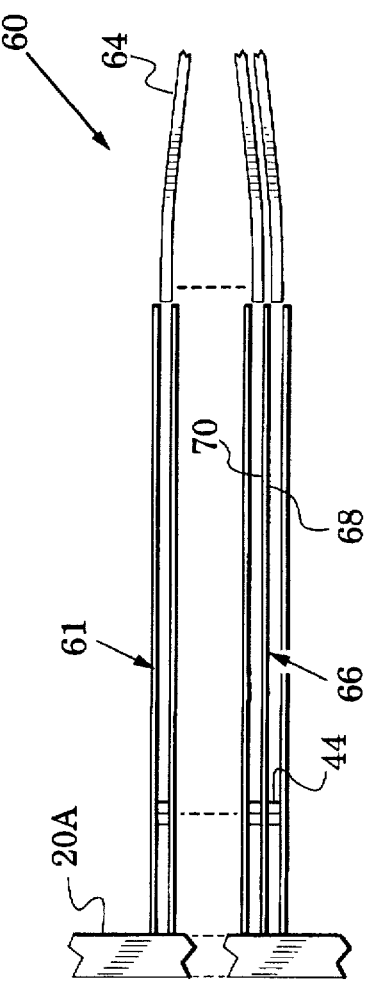
FIG. 3B

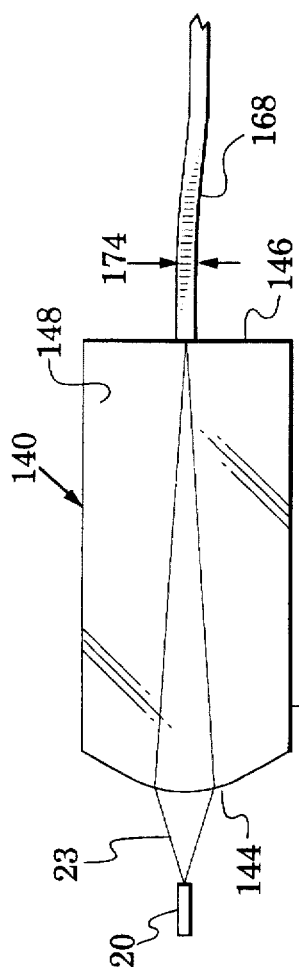
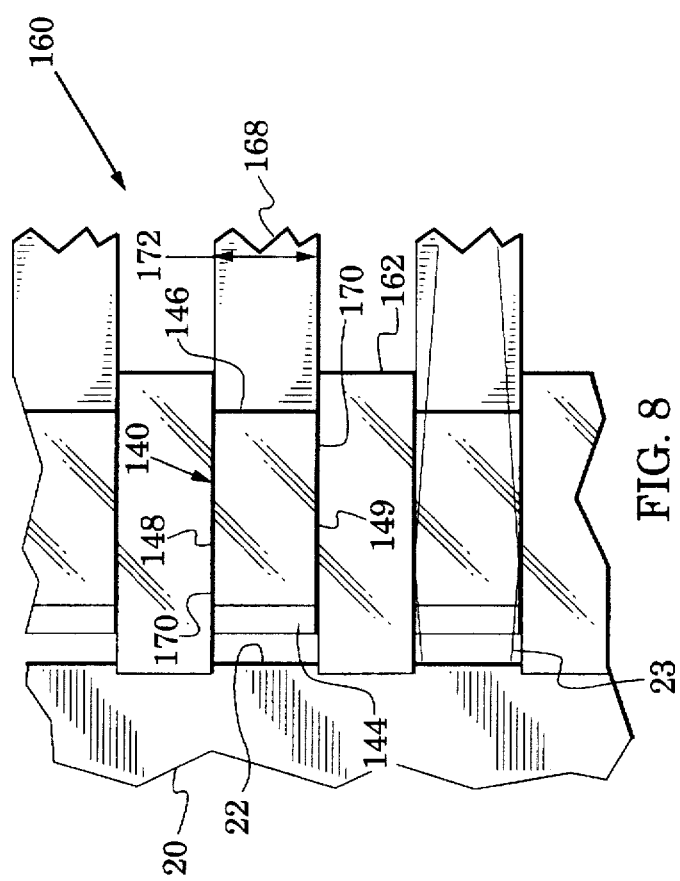

METHOD AND APPARATUS FOR CONCENTRATING AND COMBINING THE ENERGY OF ASYMMETRIC DIODE LASER BEAMS

BACKGROUND OF THE INVENTION

1. Field of the Invention

The present invention relates generally to laser diode beams and more particularly to methods and apparatus for concentrating the energy of laser diode beams to obtain high power densities.

2. Description of the Related Art

Semiconductor laser diodes have a very small emitting aperture (typically about one micron by 200 microns) that is in the same plane as their diode junction. They also have a considerably greater beam divergence (the angle between opposite beam edges) than other lasers. A typical divergence parallel to the diode junction (the "slow plane") is 10 degrees and a typical divergence normal to the diode junction (the "fast plane") is 40 degrees. In relation to its own propagation axis, a laser diode beam can be said to define a numerical aperture along a slow axial beam plane (initially, the junction plane) and a greater numerical aperture along a fast axial beam plane (initially, orthogonal to the diode plane).

The properties of laser diodes, e.g., small physical size and high efficiency, make them particularly suited for continuous wave operation in fiber-optic transmission systems. In these systems, the laser diode's active light-emitting aperture must be coupled to the light-carrying core of the optical fiber if the diode's laser energy is to be transmitted through the fiber. Because optical fiber cores and the laser diode's light-emitting aperture are both measured in microns, precise mechanical alignment becomes critical.

Multiple laser diodes are fabricated in bars which can contain many spaced diodes which produce a considerable total output power, e.g., 20–30 watts. Even though laser diodes are efficient, the removal of dissipated power is an important issue in such structures. The laser beam energy rapidly diverges which complicates the coupling of its energy into optical fibers. Coupling techniques typically involve the use of short focal length microlenses.

For example, U.S. Pat. No. 5,127,068 describes an apparatus for coupling a multiple emitter laser diode to a multimode optical fiber. It includes the use of a cylindrical microlens, such as a small diameter optical fiber, to collimate the laser diode output emissions. The collimation is performed in the high divergence axis of the laser diode, and the diameter of the optical fiber used as the microlens is chosen to roughly equal that of the coupled fiber. In another embodiment, the coupled fibers are rectangular in shape to match the geometrical distribution of power in the image of the emitting junction. This enhances the power density in the fiber.

In an embodiment described in the patent, an optical fiber array was coupled to a diode bar having a plurality of spaced laser diode emitters. Each fiber of the fiber array was spaced to match the diode spacing of the diode bar, and the microlens optical fiber was arranged between the diode bar and the fiber array and oriented to extend along the length of the laser diode bar. The fibers of the array had a 250 micron diameter. The microlens was also a 250 micron diameter fiber, spaced approximately 50 microns from the laser diode emitting surface and about 300 microns from the ends of the coupled optical fibers. Spacings this small present difficult alignment problems but are necessary because of the short focal length microlens dictated by the coupling structure. The described coupling structure also requires that a separate output optical fiber be added for each additional laser diode in the diode bar.

When used as a cylindrical lens, an optical fiber having a circular cross section provides a circular focusing shape. U.S. Pat. No. 5,080,706 describes a method of forming cylindrical microlenses having other optically desirable focusing shapes, e.g., elliptical and hyperbolic. These shapes offer better focusing properties but such cylindrical microlenses must still have very short focal lengths when used to focus laser diode beams.

The characteristics of parabolic and elliptical reflecting surfaces are well known in the optical art. A first example of the use of an off-axis parabolic or elliptical reflecting surface, i.e., an asymmetric portion of a parabolic or elliptical shape, to focus substantially parallel electromagnetic radiation rays is disclosed in U.S. Pat. No. 4,325,633. A second example is disclosed in U.S. Pat. No. 5,155,354 which is assigned to Santa Barbara Research Center, the assignee of the present invention.

SUMMARY OF THE INVENTION

The present invention is directed to methods and apparatus for concentrating the energy of electromagnetic beams that each include different numerical apertures. An exemplary beam is a laser diode beam which defines a first numerical aperture and a lesser second numerical aperture respectively along first and second axial beam planes.

These goals are realized with the recognition that such a beam can be imaged along its fast axial beam plane to a reduced numerical aperture at a focal plane while it is guided along its slow axial beam plane to maintain its second numerical aperture at the focal plane. It is recognized that if the reduced numerical aperture substantially matches the second numerical aperture, the beam can be received at the focal plane into an entrance end of an optical fiber whose energy packing efficiency is increased by matching its numerical aperture also to the second numerical aperture. The packing efficiency of the optical fiber is also increased by matching its cross-sectional dimensions with the image size produced at the focal plane by these functional steps.

It is also recognized that the energy of multiple diode beams can be concentrated by processing each of them in accordance with the foregoing steps and then grouping the exit ends of their respective fibers together into a compact pattern. The fibers, either singly or in an array, can be imaged at fractional magnification by a relay lens. A realizable reduction would be about 7.2 times which would give an area reduction of 52 times that of the fiber or fiber array. If desired, this concentrated energy pattern can be imposed on the end of an optic fiber of matching, or greater, dimensions and numerical aperture, and transmitted through the fiber along a selected path. Typical applications of this concentrated energy include photo catheterization, photo dynamic therapy, welding, soldering, and marking.

A coupler, in accordance with these concepts, is characterized by an imaging element configured to image a beam along its first axial beam plane to obtain an imaged numerical aperture at a focal plane wherein the imaged numerical aperture is reduced from the first numerical aperture, and by a pair of spaced reflecting structures arranged relative to the imaging element so as to receive the beam between the reflecting structures and guide the beam along its second axial beam plane to retain its second numerical aperture at the focal plane. Optimally, the imaged numerical aperture matches the second numerical aperture. The coupler facilitates the concentration of laser diode beam energy without requiring imaging elements whose focal lengths are so short that they excessively complicate optical alignment.

In one embodiment, the imaging element comprises a lens and the reflecting structures each comprise a mirrored surface. In another embodiment, the imaging element comprises a reflective surface whose shape is defined by an off-axis segment of an ellipsoidal cylinder, and the reflecting structures each comprise a refractive surface.

The novel features of the invention are set forth with particularity in the appended claims. The invention will be best understood from the following description when read in conjunction with the accompanying drawings.

BRIEF DESCRIPTION OF THE DRAWINGS

FIG. 1A is a side elevation view of a typical laser diode beam divergence pattern from a diode bar in a plane orthogonal to the diode plane;

FIG. 1B is a bottom plan view of a typical laser diode beam divergence pattern in the diode plane;

FIG. 1C is a front elevation view of the diode bar of FIG. 1A illustrating multiple diode apertures;

FIG. 2A is a side elevation view of an optical coupler, in accordance with the present invention, for matching the numerical apertures of a laser beam of FIGS. 1A–B;

FIG. 2B is a bottom plan view of the coupler of FIG. 2A;

FIG. 3A is a side elevation view of an optical system for concentrating the energy of multiple laser diode beams;

FIG. 3B is a bottom plan view of the system of FIG. 3A;

FIG. 3C is a view along the plane 3C—3C of FIG. 3A;

FIG. 7 is side elevation view of another optical coupler for matching laser beam numerical apertures; and FIG. 8 is a top plan view of a plurality of couplers, in accordance with FIG. 7, arranged to couple multiple beams from a diode bar into a plurality of optical fibers.

DESCRIPTION OF THE INVENTION

Figure 4:
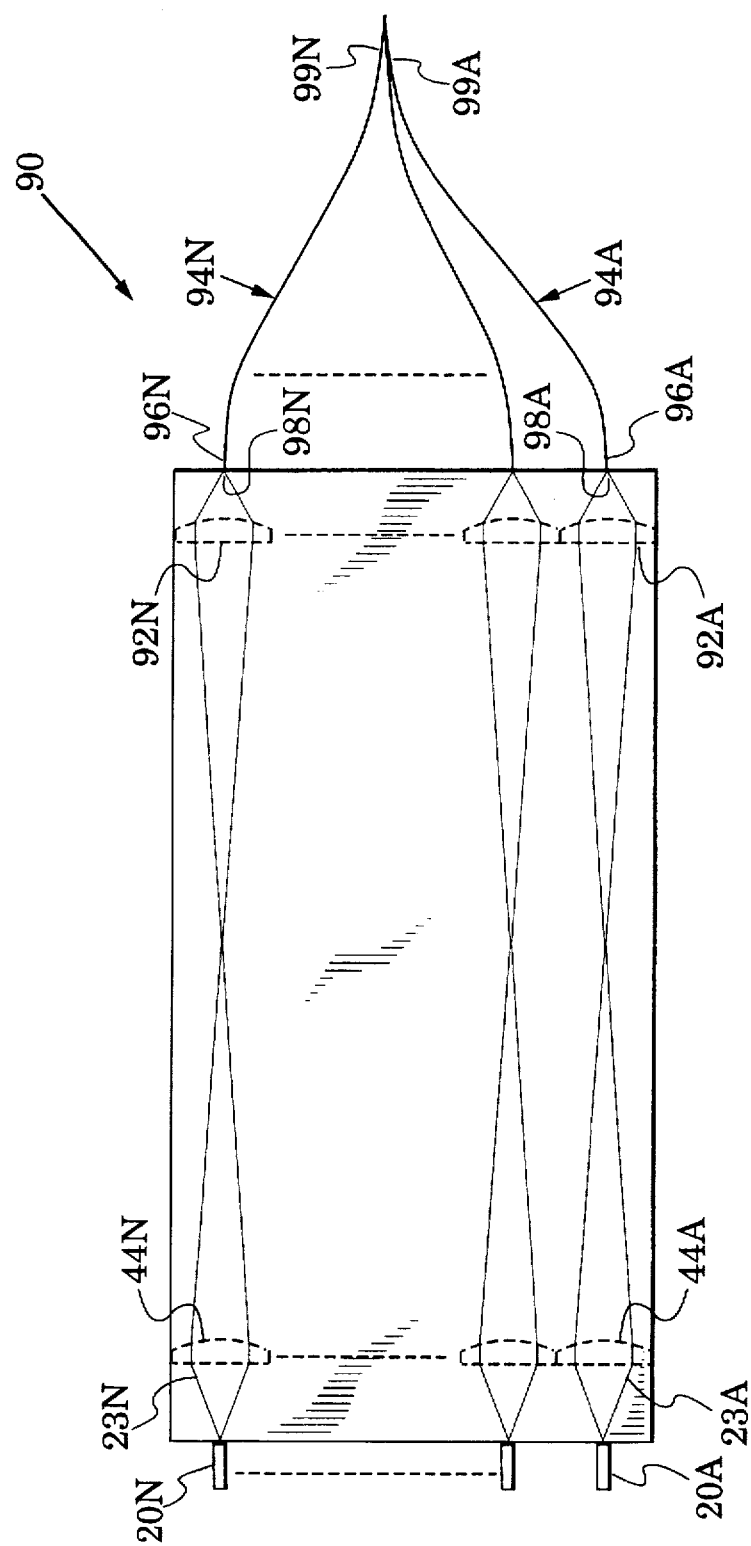
FIG. 4 is a side elevation view of another optical system for concentrating the energy of multiple laser diode beams.

An optical coupler 40, in accordance with the present invention, is illustrated in FIGS. 2A–2B. The coupler 40 is configured to substantially match the numerical apertures of an electromagnetic beam, e.g., a laser diode beam as shown in FIGS. 1A–1B, that has different first and second numerical apertures along first and second axial planes of the beam. The description of the coupler 40 will be facilitated by an understanding of the beam characteristics and by the optical concepts of numerical aperture, geometric magnification and the diffraction limit. Accordingly, these characteristics and concepts will be addressed prior to the description of the coupler 40.

FIGS. 1A–1C show a portion of a diode bar 20 having a plurality of laser emitting windows (apertures) 22. Each emitting window 22 is the emitting end of an optical resonator whose dimensions are substantially those of the active junction area of a laser diode. A typical length of a laser diode emitting window along the plane of the diode is 200 microns and a typical dimension orthogonal to the diode plane is 1 micron. As shown in FIG. 1C, the emitting windows 22 are generally arranged in a colinear relationship.

The plan view of FIG. 1B shows a beam 23 having an emission pattern 24 parallel with the slow axis of each diode in the diode bar 20 and, as shown in the side view of FIG. 1A, an emission pattern 25 parallel with the fast axis of each diode. The laser beam defines a divergence angle 26 along the slow diode axis and a greater divergence angle 28 along the fast diode axis. In the following description, exemplary values of divergence angles 26 and 28 are chosen to be respectively, 8 degrees and 35 degrees. An exemplary spacing between diodes is 500 microns.

Therefore, in relation to its own propagation axis, the laser diode beam 23 describes a divergence angle 26 along a slow axial beam plane (the broken line 30 in FIG. 1A) and a greater divergence angle 28 along a fast axial beam plane (the broken line 32 in FIG. 1B). The slow and fast axial beam planes are typically orthogonal.

The optical concepts of numerical aperture, geometric magnification and the diffraction limit are now briefly reviewed. Numerical aperture (N.A.) is a measure of the radiation gathering power of an optical component and is given by N.A.=n sin ø where n is the refractive index of the component material being transited by the radiation and ø is the half angle of the maximum radiation angle processed by the component in that material. For example, the numerical apertures of the diode beam 23 of FIGS. 1A–1B along its slow and fast axial beam planes are sine $ø_s$ and sine $ø_f$ in which the angles $ø_s$ and $ø_f$ are respectively ½ of the divergence angles 26 and 28. This follows because the refractive index of air is one.

When applied to optical fibers, numerical aperture represents the angle of acceptance; the largest cone of rays that are accepted for transmission by the fiber. The numerical aperture of optical fibers can be calculated from $\{(n_{cr})^2 - (n_{cd})^2\}^{1/2}$, in which $n_{cr}$ is the refractive index of the fiber core and $n_{cd}$ is the refractive index of the fiber cladding.

In a specular optical system (one in which the laws of reflection and refraction apply), geometric magnification is governed by the sine law which states that the product of image height H and numerical aperture is a constant C at any stage of the system, i.e., H(n sin ø)=C. It follows that the ratio of image heights at various stages along the system is expressed by the inverse ratio of the numerical apertures at those stages. For example, if $H_i$ and $H_f$ are the image heights respectively at the initial and final stages of a system, the geometric magnification m of the system is given by $m=H_f/H_i=(n_i \sin ø_i)/(n_f \sin ø_f)$.

The diffraction limit is a consequence of the wave character of light which causes blurring of optical images. This presents a fundamental limitation in instrument resolution, i.e., the sharpness of optical images can never exceed the limits imposed by diffraction. Images that have reached this limit are said to be "diffraction limited". A thin rectangular aperture generates a diffraction pattern consisting of parallel light bars spaced on each side of a central bar. The width W from the radiation minimum on one side of the central bar to the minimum on the other side is given by W=γ/n sin ø=γ/N.A., in which γ is the radiation wavelength. The energy within this width is approximately 90% of the total beam energy.

In a similar manner, a circular aperture will produce a diffraction pattern having a central spot surrounded by spaced rings. The diameter D from the radiation minimum on one side of the central spot to the minimum on the other side is given by D=1.22 γ/n sin ø=1.22 γ/N.A. The energy within this diameter is approximately 87% of the total beam energy.

Having introduced particular laser diode beam characteristics and general optical concepts, attention is now directed to the coupler embodiment 40 illustrated in FIGS. 2A and 2B. The optical coupler 40 is particularly intended to reduce the fast axial beam plane numerical aperture of the laser beam 23 to that of its slow axial beam plane. For descriptive purposes, it will be assumed that the beam 23 has a slow divergence angle (26 in FIG. 1B) of 10° and a fast divergence angle (28 in FIG. 1A) of 40°. It is recognized that some energy lies outside the 10° by 40° beam. If desired, larger system angles can be used to gather this energy with a resultant loss of energy density at the output. Because the refractive index of air is one, the numerical apertures along the slow and fast axial beam planes of the beam 23 are then sine (10/2)°=0.087 and sine (40/2)°=0.342.

The coupler 40 has a cylindrical optical lens 44 (a cylindrical lens is one having a constant optical cross-section along a longitudinal axis) which is spaced from the diode bar 20 and configured to form a real image of an emitting window (22 in FIG. 1B) at a focal plane 48. The lens 44 is also configured to reduce the numerical aperture along the fast axial beam plane from 0.342 to 0.087, i.e., cause the numerical apertures of the slow and fast axial beam planes to be substantially matched.

The lens 44 is carried between a pair of panels 50, 52 which respectively have reflective surfaces 54, 56. The panels are arranged so that the reflective surfaces 54, 56 are oppositely spaced from the fast axial beam plane (32 in FIG. 1B) and each is arranged immediately adjacent a different side of the emitting window (22 in FIG. 1C). Thus, as shown in FIG. 2B, any ray 58 of the beam 23 is received between the surfaces 54, 56 and reflected from them to describe the same angle relative to the beam axis at the focal plane 48 as it had when it left the diode emitting window. Therefore, the reflecting surfaces 54, 56 contain and guide the beam 23 along the slow axial beam plane to the focal plane 48 and also preserve the numerical aperture along the slow axial beam plane, i.e., the numerical aperture at the focal plane 48 in the slow axial beam plane is still 0.087.

Attention is now directed to the resultant image heights due to geometrical magnification and diffraction effects at the focal plane 48. In accordance with the sine law, the magnification along each of the slow and fast axial beam planes is given by the ratio of the numerical aperture at the focal plane to the numerical aperture at the emitting window and are, therefore, respectively $m_s=0.087/0.087=1$ and $m_f=0.342/0.087=3.93$. Assuming that the emitting window (22 in FIG. 1C) has dimensions of 1 micron by 200 microns, the magnified image dimensions at the focal plane 48 are 3.93 microns by 200 microns.

In the focal plane diffraction pattern that is parallel with both of the slow and fast axial beam planes, the central diffraction bar will have a height of γ/N.A.=0.7/0.087=8 microns for a wavelength of 0.7 micron in the near infrared. The power distribution of diffraction limited images in specular optical systems is given by the convolution of the diffraction pattern and the geometrically predicted image height. In this case, the diffraction dimension of 8 microns and the geometric prediction of 3.93 microns will convolve to 11.93 microns.

In operation therefore, the optical coupler 40 substantially matches the numerical apertures of the beam 23 in its slow and fast axial beam planes and produces an image size at the focal plane 48 that is essentially preserved in the slow axial beam plane and magnified by the ratio of input numerical aperture and output numerical aperture (plus diffraction effects) in the fast axial beam plane. Although the panels 50, 52 are shown to be connected only by the lens 44 in FIGS. 2A–2B, it should be apparent that additional structures for support of these panels can be added in any way that does not compromise the optical path.

The operational features of the optical coupler 40 are advantageously applied in the optical system 60 shown in FIG. 3A. The system 60 includes portions of the coupler 40 that are arranged in a vertically spaced arrangement, e.g., lenses 44A–44N are partially carried by a side panel 61 which is a vertically enlarged version of the panel 50 of FIG. 2A. Optical ribbon fibers 64 are arranged to receive each diode's laser beam at a corresponding focal plane. For example, one end 62A of an optical ribbon fiber 64A is positioned at the focal plane 48A to receive therefrom the beam 23A. The ends 62B–62N of optical ribbon fibers 64B–64N are similarly arranged to receive imaged and guided beams from their associated focal planes 48B–48N.

FIG. 3B further illustrates that structures in accordance with the coupler 40 of FIGS. 2A–2B can be spaced along each diode bar 20 to receive radiation from the diode windows of that bar. The beams from adjacent windows can be guided along shared panels, e.g., the panel 66 has opposed reflecting surfaces 68, 70 to help contain and guide adjacent laser beams. Basically, FIGS. 3A–3B illustrate that structures in accordance with FIGS. 2A–2B can be arranged in an array and a plurality of optical ribbon fibers 64 can be arranged to receive the beams issuing from this array. In accordance with FIGS. 2A–2B, each of these beams have matched numerical apertures along their slow and fast axial beam planes at a respective focal plane.

In the system 60, a relay lens 74 is positioned to image the ends 76A–76N of the optical ribbon fibers 64A–64N at a spatial location 78. In order to increase the concentration of the laser beams at the location 78, the ends 76A–76N are grouped together and are further arranged without spaces between adjacent fibers and within an imaginary outline that is a scaled version of the cross-sectional shape of the desired energy pattern. For example, if the desired shape is circular, then the ribbon fiber ends 76 would be arranged to fall within an outline in the form of a circle 84 as shown in FIG. 3C which is a view along the plane 3C–3C. An optical fiber 80, with its end receiving the image at the spatial location 78, can transport the energy through remote and convoluted paths.

Having introduced the structure of the optical system 60 of FIGS. 3A–3C, attention is now directed to its operation as illustrated by an exemplary system design. Assume a working goal of 0.5 for the numerical aperture of the output of the imaging lens 74 in FIG. 3A. This is a reasonable goal because optical fibers with a numerical aperture of 0.5 (acceptance angle of 30°) are readily obtainable for use as the output fiber 80 and lenses having a numerical aperture of 0.5 for small fields of view can be obtained.

As calculated above, the numerical aperture at the emergent end of the fibers is 0.087. Therefore, the fractional magnification by the relay lens 74 is 0.087/0.5 or 0.174. It is a transmission property of optical fibers that energy having an entrance numerical aperture less than that of the fiber will tend to expand, as it travels through the fiber, to have an exit numerical aperture as high as that of the fiber. Essentially, this means that energy density has been lost during transit through the fiber. Accordingly, for an efficient beam concentrating system, it is preferred that the numerical apertures of each of the laser beams 23 are closely matched at their focal plane 48 to the numerical aperture of their respective ribbon fibers 64. This is not possible if the numerical apertures along different axial beam planes of the beams 23 are not matched at their respective focal planes.

In accordance with a feature of the present invention, the optical coupler 40 of FIGS. 2A–2B is configured to substantially match the slow and fast axial beam plane numerical apertures. In particular, in the exemplary design, each beam 23 is imaged along its fast axial beam plane to have substantially the same numerical aperture of 0.087 that is maintained along the slow axial beam plane. The numerical aperture of each optical ribbon fiber 64 is then preferably chosen to have substantially the same numerical aperture to increase the system's concentration efficiency.

The energy concentration efficiency of the system 60 will also be increased if the cross sectional dimensions of each ribbon fiber 64 are matched to the image size at its focal plane 48. The image size was calculated above relative to the coupler 40 to be 11.93 microns by 200 microns. Therefore, the cross-sectional dimensions of the ribbon fibers 48, in an idealized system, are preferably set at 11.93 by 200 microns and the fibers configured to have a numerical aperture of 0.087.

The lens 74 images the fiber ends 76 onto an end of the output optical fiber 80. For clarity of illustration, the fiber ends 76 are shown spaced from each other. In operation, they would be arranged without spaces between adjacent fiber ends to further concentrate the energy within the imaginary circle 84.

The preceding portion of the system design causes the radiation to emerge from the ends 76A–76N with a numerical aperture of 0.087 in both vertical and horizontal planes of the fibers 64. At the beginning of the exemplary system design, it was assumed that the output optical fiber 80 will have a numerical aperture of 0.5 (acceptance angle of 30°). The concentration efficiency of the system 60 is increased if the output numerical aperture of the lens 74 matches the numerical aperture of the fiber 80.

The geometrical fractional magnification of the lens 74 in this case is the ratio of input and output numerical apertures, or 0.087/0.5=0.174 If the imaginary circle 84 has a diameter of 1600 microns, the image at the optical fiber 80 will have a diameter of 0.174×1600=278 microns. The diffraction diameter of the output image of the lens is $D=1.22 \, \gamma/N.A.=$ 1.7 microns, which is negligible compared to the image diameter. Therefore, the exemplary system design finishes by choosing an output optical fiber 80 that preferably has a numerical aperture of 0.5 and a diameter of 278 microns.

Systems in accordance with the teachings of the invention thus facilitate the matching of numerical apertures along different axial beam planes of electromagnetic beams. This matching allows increased packing efficiency as the beam can then be received into an intermediate optical fiber whose numerical aperture is matched to the equalized numerical apertures of the beam. An image size at the focal plane results from geometrical magnification and diffraction effects associated with the numerical apertures. To further increase energy concentration, the cross-sectional dimensions of the intermediate optical fiber are matched to this resultant image size. Finally, a total system fractional magnification is realized by grouping the ends of a plurality of intermediate fibers together and focusing them onto an output fiber. In this latter operation, similar attention is given to matching the cross-sectional dimensions and numerical aperture of the output fiber with the image size and numerical aperture that results from the focusing operation.

Although the lenses 44 were shown in FIGS. 2A and 3A to be plano-convex, it should be understood that this was for exemplary purposes. Any lens shape, e.g., plano-convex, convex-convex, may be used in the invention that images the beams along their fast axial beam plane and achieves a reduced numerical aperture; preferably, one that matches that along the slow axial beam plane.

In the system 60 of FIGS. 3A–3C, the beams 23 were received into optical fibers at the locations where each beam's numerical apertures had been matched. The beams were then imaged, in the exemplary system design, into an output fiber 80 with a numerical aperture of sine 30°=0.5. These operations resulted in a fractional magnification of the fiber ends of 0.087/0.5=0.174.

In contrast, the fractional magnification can proceed after the matching of numerical apertures but prior to reception of the beams into optical fibers. This is illustrated in the optical system 90 of FIG. 4, a view similar to FIG. 3A and in which like elements have like reference numbers.

The system 90 includes a plurality of spherical lenses 92A–92N that each reimage the image formed by a respective cylindrical lens 44. A plurality of optical fibers 94A–94N have ends 96A–96N that are each positioned at the output focal points 98A–98N of respective lenses 92A–92N to receive the image at the focal point. The opposite ends 99A–99N of these fibers can be gathered and arranged similar to the fiber ends 76A–76N in FIG. 3A for imaging into an output optical fiber.

The spherical lenses 92, for the exemplary design would have an input numerical aperture of 0.087 and an output numerical aperture of 0.5. As in the system 60, the total fractional magnification along the slow and fast axial beam points would respectively be sine 5°/sine 30°=0.174 and sine 20°/sine 30°=0.68. If the emitting window of the diodes were again 1 by 200 microns, the image size at the focal points 98A–98N would be 0.68 by 28 microns. Thus, for increased concentration of beam energy, the system 90 generally requires smaller optical fibers than does the system 60 shown in FIGS. 3A–3C. The lens count for this system 90 is also greater than in the system 60.

Figure 5A:
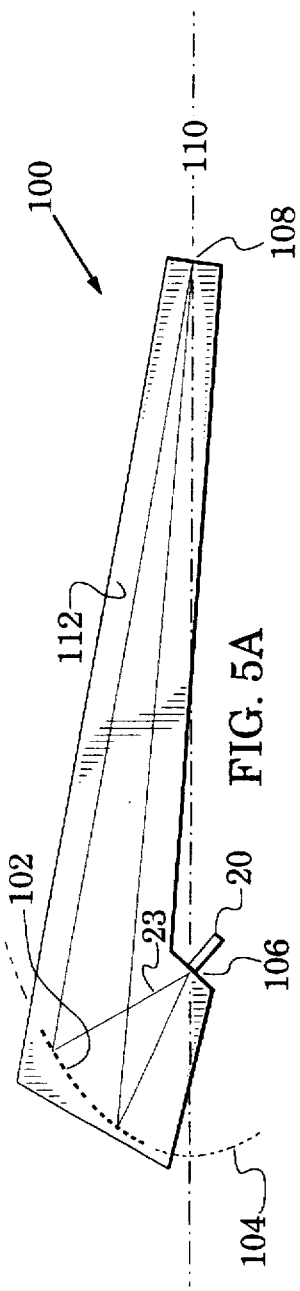
FIG. 5A is side elevation view of another optical coupler for matching laser beam numerical apertures.
Figure 5B:
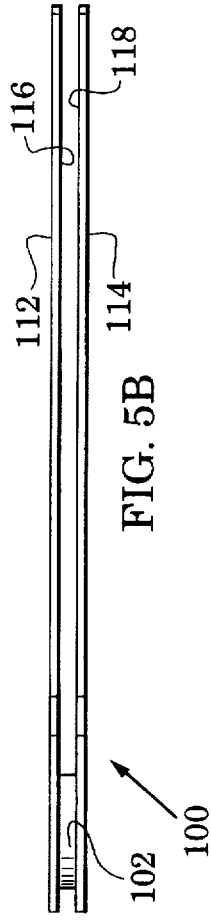
FIG. 5B is a bottom plan view of the coupler of FIG. 5A.

The optical coupler 40 of FIGS. 2A–2B preferably employs a lens for imaging a laser beam in its fast optical beam plane to facilitate the matching of numerical apertures. The teachings of the invention may be extended to any optical structure that performs this imaging function. For example, FIGS. 5A and 5B show a coupler 100 in which the lens 44 of the coupler 40 is functionally replaced by an elliptical mirror 102.

The mirror 102 is an off-axis segment of an imaginary ellipsoidal cylinder 104 that has a near focus 106 and a far focus 108 along its major axis 110. A diode emitting window, e.g., in a diode bar 20 shown only in FIG. 5A for clarity of illustration, is positioned at the near focus 106 and oriented so that the beam 23 reflects from the mirror 102. The energy is directed from the near focus 106, via the mirror 102, to the far focus 108 in accordance with the well known optical properties of elliptical surfaces. The focal length of the mirror 102 can be adjusted to achieve the desired numerical aperture in the fast axial beam plane. As in the coupler 40, an optical fiber can be positioned at the far focus 108 to receive the beam. The mirror 102 is carried between panels 112, 114 having reflecting surfaces 116, 118 similar to the panels 50, 52 and reflecting surfaces 54, 56 of the coupler 40. Similar to the coupler 40, the reflecting surfaces 54, 56 guide and contain the beam 23 to the far focus 108.

Figure 6A:
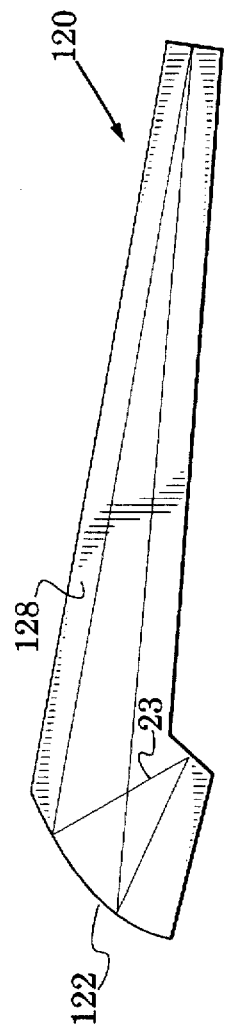
FIG. 6A is side elevation view of another optical coupler for matching laser beam numerical apertures.
Figure 6B:
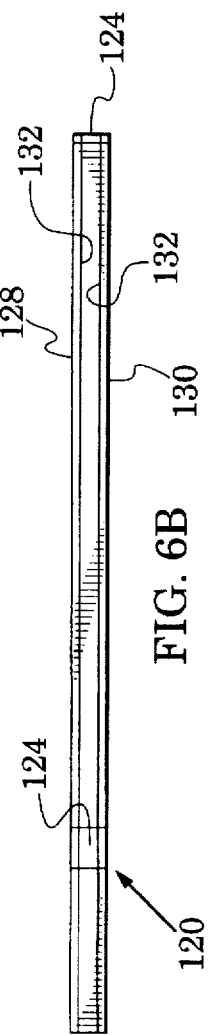
FIG. 6B is a bottom plan view of the coupler of FIG. 6A.

FIGS. 6A, 6B show another optical coupler embodiment 120 for matching numerical apertures along the slow and fast axial beam planes of a laser diode beam. The embodiment 120 is similar to the embodiment 100 of FIGS. 5A, 5B in that it employs a reflective elliptical mirror 122 for imaging the beam in the fast axial beam plane and has reflecting surfaces for guiding and containing the beam along the slow axial beam plane.

However, the mirror 122 in FIGS. 6A–6B is the outer surface of a plate 124 formed of a material that is transparent to the radiation beam, e.g., glass, and the reflecting surfaces are formed by refractive boundaries. The refractive boundaries can be realized by a cladding on the sides of the plate 124 that has a refractive index sufficient to provide, with the refractive index of the plate material, total internal reflection at the desired numerical aperture. The elliptical mirror 122 is realized with a conventional mirror coating. In the coupler 120, the thin plate 124 is structurally strengthened by plates 128, 130 which are bonded to the plate 124 with adhesive 132. With a proper choice of its refractive index, the adhesive 132 can also provide the required cladding.

The operation of the coupler 120 is similar to that of the coupler 100, except the beam travels through the material of the plate 124 rather than through air. The operational numerical apertures are unchanged by this difference but, in accordance with Snell's Law, the radiation angles within the plate 124 would change because its refractive index would typically differ from that of air.

FIG. 7 is a side elevation view of another optical coupler embodiment 140 for matching different numerical apertures of a laser beam 23. The embodiment 140 has a body 142 of radiation-transparent material, e.g., glass, which defines a cylindrical lens 144. The lens 144 is configured to image the beam 23 in its fast axial beam plane to a focal plane and is preferably configured to reduce the entry numerical aperture in this axial beam plane to an exit numerical aperture that matches the numerical aperture in the slow axial beam plane. The body 142 also extends rearward from the lens 144 to define a rear surface 146 that is positioned coplanar with the image plane of the lens 144. The body 142 further defines a pair of spaced side walls which carry a cladding with a material having a refractive index sufficient to provide total internal reflection of the beam 23 along its slow axial beam plane. In the side view of FIG. 7, only the near side wall 148 is visible.

The operation of the coupler 140 can be described by its use in the preferred system embodiment 160 illustrated in FIG. 8. The system 160 has a plurality of couplers 140 interleaved with a plurality of spacers 162 made of any compatible material, e.g., glass. The couplers 140 and spacers 162 are arranged adjacent a diode bar 20 so that each coupler 140 is spaced from an emitting window 22. Either the spacers 162 or the diode bar 20 are preferably notched to receive the other to facilitate locating the couplers 140, and also to provide support between the spacers 162 and the diode bar 20.

A plurality of optical fibers 168 are arranged to each abut a different one of the couplers 140 on its rear surface 146. The spacers 162 extend past the rear surfaces 146 of the couplers 140 to aid in location and support of the fibers 168. The couplers 140, spacers 162 and optical fibers 168 are bonded together on abutting surfaces with an adhesive 170. On the coupler side walls 148, 149, the adhesive 170 can also be the cladding required for total internal reflection from these side walls. In FIG. 8, an exemplary laser diode beam 23 is shown issuing from an emitting window 22. The numerical aperture along the slow axial beam plane is maintained as the beam is guided along this plane by total internal reflection from the walls 148, 149.

To increase the concentration of energy in the fibers 168, their numerical apertures are selected to match those of their respective beams. In the fast axial beam plane, the beam 23 would be imaged on a plane that is coplanar with the rear surface 146 of its respective coupler. The lens 144 is preferably configured to produce an output numerical aperture in the fast axial beam plane substantially matched to that of the slow axial beam plane. The width 172 of each optical fiber 168 is essentially the same as that of the emitting window 22. The fiber height (174 in FIG. 7) is preferably matched to the image height produced by the geometrical magnification and diffraction effects of the lens 144.

The embodiments described above are especially suited for concentrating the energy of laser diode beams whose numerical apertures along different axial beam planes are different. The preferred embodiments of the invention described herein are exemplary and numerous modifications and rearrangements can be readily envisioned to achieve an equivalent result, all of which are intended to be embraced within the scope of the appended claims.

I claim:

1. A method of concentrating the energy of an electromagnetic beam that defines a first numerical aperture and a lesser but nonzero second numerical aperture respectively along first and second axial beam planes, comprising the steps of:

imaging said beam along its first axial beam plane to obtain a real image and a nonzero imaged numerical aperture at a focal plane wherein said imaged numerical aperture is reduced from said first numerical aperture; and guiding said beam along its second axial beam plane to retain its second numerical aperture at said focal plane.

2. A method of concentrating the energy of an electromagnetic beam that defines a first numerical aperture and a lesser second numerical aperture respectively along first and second axial beam planes, comprising the steps of:

imaging said beam along its first axial beam plane to obtain a real image and an imaged numerical aperture at a focal plane wherein said imaged numerical aperture is reduced from said first numerical aperture and substantially matches said second numerical aperture; and guiding said beam along its second axial beam plane to retain its second numerical aperture at said focal plane.

3. The method of claim 2, wherein said imaging step includes the step of reflecting said beam from a reflective surface whose shape is defined by a segment of an ellipsoidal cylinder.

4. The method of claim 3, wherein said ellipsoidal cylinder has a major axis and said segment is spaced from said major axis.

5. The method of claim 2, wherein said guiding step includes the step of containing said beam between spaced first and second refractive boundaries.

6. The method of claim 5, wherein said refractive boundaries are formed by two adjoining materials having different refractive indexes.

7. The method of claim 2, further including the step of receiving said beam from said focal plane in an optical fiber.

8. The method of claim 7, wherein said optical fiber has a fiber numerical aperture and said receiving step includes the step of substantially matching the numerical aperture of said optical fiber and said imaged numerical aperture.

9. The method of claim 2, wherein said imaging step includes the step of focusing said beam through a lens.

10. The method of claim 2, wherein said guiding step includes the step of containing said beam between spaced first and second mirrored boundaries.

11. A method of concentrating the energy of an electromagnetic beam that defines a first numerical aperture and a lesser second numerical aperture respectively along first and second axial beam planes, comprising the steps of:

imaging said beam along its first axial beam plane to obtain an imaged numerical aperture at a focal plane wherein said imaged numerical aperture is reduced from said first numerical aperture;

guiding said beam along its second axial beam plane to retain its second numerical aperture at said focal plane;

receiving said beam from said focal plane in an optical fiber which has a cross-sectional dimension;

producing an image having a combined image and diffraction height; and substantially matching said cross-sectional dimension and said combined image and diffraction height.

12. A method of concentrating the energy of a plurality of electromagnetic beams that each define respective first numerical apertures and respective lesser second numerical apertures along respective first and second axial beam planes, comprising the steps of:

imaging each of said beams along its first axial beam plane to obtain an imaged numerical aperture at a focal plane, wherein said imaged numerical aperture is reduced from said first numerical aperture;

guiding each of said beams along its second axial beam plane to retain its second numerical aperture at its respective focal plane;

receiving each of said beams from its respective focal plane with an entrance end of a respective intermediate optical fiber which also includes an exit end;

providing an output optical fiber;

grouping the exit ends of said intermediate optical fibers together; and forming an image of said exit ends onto an end of said output optical fiber.

13. The method of claim 12, wherein said grouping step includes the step of arranging said exit ends of said intermediate optical fibers within an outline that is substantially a scaled version of the cross-sectional shape of said output optical fiber.

14. The method of claim 12, wherein said forming step includes the step of substantially matching an input numerical aperture formed by said forming step and the numerical apertures of said intermediate optical fibers.

15. The method of claim 12, wherein said forming step includes the step of substantially matching an output numerical aperture formed by said forming step and the numerical aperture of said output optical fiber.

16. The method of claim 12, wherein said forming step includes the step of substantially matching the output combined image and diffraction height resulting from said forming step and a cross-sectional dimension of said output optical fiber.

17. The method of claim 12, wherein the imaged numerical aperture of each of said beams substantially matches its second numerical aperture.

18. A coupler for concentrating the energy of an electromagnetic beam that defines a first numerical aperture and a lesser but nonzero second numerical aperture respectively along first and second axial beam planes, comprising:

an imaging element configured to image said beam along its first axial beam plane to obtain a real image and a nonzero imaged numerical aperture at a focal plane wherein said imaged numerical aperture is reduced from said first numerical aperture; and a pair of spaced reflecting structures arranged relative to said imaging element so as to receive said beam between said reflecting structures and guide said beam along its second axial beam plane to retain its second numerical aperture at said focal plane.

19. A coupler for concentrating the energy of an electromagnetic beam that defines a first numerical aperture and a lesser second numerical aperture respectively along first and second axial beam planes, comprising:

an imaging element configured to image said beam along its first axial beam plane to obtain a real image and an imaged numerical aperture at a focal plane wherein said imaged numerical aperture is reduced from said first numerical aperture and substantially matches said second numerical aperture; and a pair of spaced reflecting structures arranged relative to said imaging element so as to receive said beam between said reflecting structures and guide said beam along its second axial beam plane to retain its second numerical aperture at said focal plane.

20. The coupler of claim 19, wherein said reflecting structures each comprise a refractive surface.

21. The coupler of claim 20, wherein each of said refractive surfaces includes first and second adjoining materials having different refractive indexes.

22. The coupler of claim 19, further including an optical fiber having an end positioned at said focal plane to receive said beam.

23. The coupler of claim 22, wherein said optical fiber has a fiber numerical aperture substantially matching said imaged numerical aperture.

24. The coupler of claim 19, wherein said imaging element comprises a lens.

25. The coupler of claim 19, wherein said imaging element comprises a reflective surface whose shape is defined by a segment of an ellipsoidal cylinder.

26. The coupler of claim 25, wherein said segment is spaced from the major axis of said ellipsoidal cylinder.

27. The coupler of claim 19, wherein said reflecting structures each comprise a mirrored surface.

28. A coupler for concentrating the energy of an electromagnetic beam that defines a first numerical aperture and a lesser second numerical aperture respectively along first and second axial beam planes, comprising:

an imaging element configured to image said beam along its first axial beam plane to obtain an imaged numerical aperture at a focal plane wherein said imaged numerical aperture is reduced from said first numerical aperture;

a pair of spaced reflecting structures arranged relative to said imaging element so as to receive said beam between said reflecting structures and guide said beam along its second axial beam plane to retain its second numerical aperture at said focal plane; and an optical fiber having an end positioned at said focal plane to receive said beam;

wherein said imaging element produces an image having a combined image and diffraction height and said optical fiber has a cross-sectional dimension substantially matching said combined image and diffraction height.

29. A system for concentrating the energy of a plurality of electromagnetic beams that each define respective first numerical apertures and respective lesser second numerical apertures along respective first and second axial beam planes, comprising:

- at least one imaging element configured to image one or more of said beams along its first axial beam plane to obtain an imaged numerical aperture at a focal plane, wherein said imaged numerical aperture is reduced from said first numerical aperture;
- at least one pair of spaced reflecting structures arranged relative to said imaging element so as to receive one or more of said beams between said reflecting structures and guide each of said beams along its second axial beam plane to retain its second numerical aperture at its respective focal plane;
- a plurality of intermediate optical fibers each having an entrance end and an exit end, with each of said entrance ends positioned to receive a different one of said beams at its respective focal plane and said exit ends grouped together;
- an output optical fiber; and
- a lens arranged and configured to focus said exit ends onto an end of said output optical fiber.

30. The system of claim 29, wherein said exit ends are arranged within an outline that is substantially a scaled version of the cross-sectional shape of said output optical fiber.

31. The system of claim 29, wherein said intermediate optical fibers each have a numerical aperture and said lens is configured to have an input numerical aperture substantially matched to the numerical apertures of said intermediate optical fibers.

32. The system of claim 29, wherein said output optical fiber has a numerical aperture and said lens is configured to have an output numerical aperture substantially matched to the numerical aperture of said output optical fiber.

33. The system of claim 29, wherein said lens is configured to produce a combined image and diffraction height and said output fiber is configured to have a cross-sectional dimension substantially matching said combined image and diffraction height.

34. The system of claim 29, wherein the imaged numerical aperture of each of said beams substantially matches its second numerical aperture.

* * * * *